United States Patent [19]

Hayashida

[11] 4,148,190
[45] Apr. 10, 1979

[54] MASTER CYLINDER

[75] Inventor: Yoshihiro Hayashida, Chigasaki, Japan

[73] Assignee: Tokico Ltd., Kanagawa, Japan

[21] Appl. No.: 797,114

[22] Filed: May 16, 1977

[30] Foreign Application Priority Data

May 14, 1976 [JP] Japan .................. 51-55046

[51] Int. Cl.² .......................... B60T 7/02; F15B 7/08
[52] U.S. Cl. .................................................. 60/594
[58] Field of Search ............... 60/533, 562, 588, 592, 60/584, 594; 92/79, 168; 277/178, 212, 152, 153, 180; 251/332

[56] References Cited

U.S. PATENT DOCUMENTS

| 3,068,652 | 12/1962 | Rodway | 92/79 |
|---|---|---|---|
| 3,426,531 | 2/1969 | Reznicek | 60/588 |
| 3,557,555 | 1/1971 | Wilson | 60/562 |
| 3,686,866 | 8/1972 | Blount | 60/562 |

FOREIGN PATENT DOCUMENTS

| 1600136 | 1/1970 | Fed. Rep. of Germany | 60/533 |
|---|---|---|---|
| 2307997 | 4/1976 | France | 60/592 |

Primary Examiner—Martin P. Schwadron
Assistant Examiner—Abraham Hershkovitz
Attorney, Agent, or Firm—Wenderoth, Lind & Ponack

[57] ABSTRACT

A master cylinder including a housing, a cylinder defined in the housing, a piston slidably fitted in the cylinder, a spring urging the piston toward an open end of the cylinder, a push rod for actuating the piston against the force of the spring to compress hydraulic fluid in the cylinder, and a stopper ring retained in the open end of the cylinder for abutting with the push rod to define the non-actuated position of the piston, wherein a seal is disposed between the inner periphery of the cylinder and the stopper ring and between the stopper ring and the push rod when the piston is in its non-actuated position.

5 Claims, 4 Drawing Figures

MASTER CYLINDER

BACKGROUND OF THE INVENTION

This invention relates to master cylinders for use in hydraulic systems such as hydraulic braking systems or hydraulic clutch actuating systems in automobiles or the like.

In a hydraulic system utilizing hydraulic fluid such as oil or the like as actuating fluid it is necessary to remove or expel air completely from the system including various components and pipe lines to operate the system satisfactorily. Usually, a bleed valve is provided in one or more components of the system for expelling air which has remained in the system whle filling hydraulic fluid into the system, but the air-bleeding operation is time-consuming and troublesome.

A method has been proposed for filling hydraulic fluid quickly and completely into a hydraulic system or into a hydraulic component such as a master cylinder or the like, in which, firstly, the system or the component is connected to a source of a high vacuum pressure (for example, 750 mmHg gauge or more) so as to substantially extract or remove air from the interior of the system or the component, and secondly, hydraulic fluid is supplied into the system or the component by, for example, exchanging a three way valve which is connected to the source of vacuum pressure, a hydraulic fluid supplying tank, and a suitable fitting formed or connected to the system or the component. The method is particularly adapted for filling hydraulic fluid into a newly assembled hydraulic system or into a newly manufactured hydraulic component quickly and easily.

While, a master cylinder constituting one of the essential components in a hydraulic braking system or clutch actuating system has been formed such that a cup-shaped seal (usually called as a secondary cup) fitted on a piston acts to seal an oil chamber defined in a cylinder in which the piston works from the outside of the master cylinder, the secondary cup is disposed essentially to prevent leakage of oil from the oil chamber to the outside. Thus, when vacuum pressure is applied in the oil chamber according to the aforementioned method, atmospheric air will pass through the secondary cup relatively easily, whereby it is not possible to attain a desired high vacuum in the system or in the oil chamber of the master cylinder, thus causing the presence of residual air when oil is filled into the system or into the master cylinder thereafter.

An object of the present invention is to provide an improved master cylinder elminating the aforementioned shortcomings.

BRIEF DESCRIPTION OF THE DRAWINGS

Further objects and advantages of the present invention will be described in detail in conjunction with the accompanying drawings exemplifying some embodiments of the present invention, and in which.

DETAILED DESCRIPTION OF THE INVENTION

Figure 1:
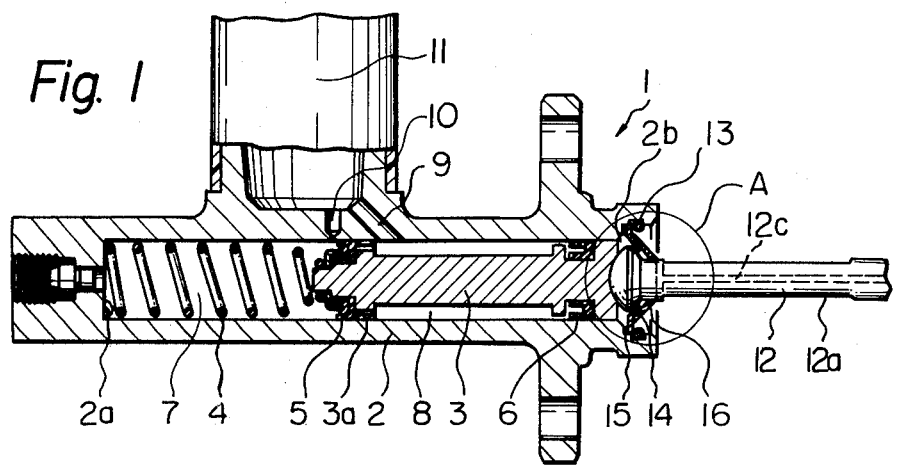
FIG. 1 is a longitudinal cross-sectional view of a master cylinder according to the present invention.

A master cylinder 1 shown in FIG. 1 comprises a cylinder portion 2 receiving a piston 3 slidably therein. A spring 4 is interposed between a bottom wall 2a of the cylinder portion 2 and the piston 3 to urge the piston 3 toward the open end of the cylinder portion or the rightward direction in the drawing. A primary cup 5 and a secondary cup 6 are fitted on the piston 3, and a pressure chamber 7 and a supply chamber 8 are defined respectively between the primary cup 5 and the bottom wall 2a of the cylinder portion 2 in the cylinder portion 2 and between the primary cup 5 and the secondary cup 6 in an annular space around a reduced diameter portion of the piston 3. In the normal retracted or non-actuated condition of the master cylinder shown in the drawing, the pressure chamber 7 is communicated through a relief port 10 with a reservoir 11 which is formed integrally in the master cylinder 1. The supply chamber 8 is permanently connected with the reservoir 11 through a supply port 9. The supply chamber 8 is adapted to connect with the pressure chamber 7 during the retracting stroke of the piston 3 through holes 3a formed in the piston 3 with the primary cup 5 being deflected. A push rod 12 receiving input force from a brake pedal or the like (not shown) abuts with the piston 3. The end of the push rod 12 abutting with the piston 3 is formed to have a mushroom-like shape, and in the non-actuated condition of the master cylinder the mushroomlike end engages with a stopper ring 14 which is retained in the cylinder portion 2 by a C-shaped clip 13, whereby the retracted position of the piston 3 receiving the spring force of the spring 4 is controlled by the stopper ring 14.

A first seal member 15 formed of elastic material such as rubber or the like is interposed between an outwardly facing shoulder 2b formed in the open end portion of the cylinder portion 2 and an innerside surface of the stopper ring 14 at the outer circumferential portion thereof. The seal member 15 air-tightly seals a portion between the cylinder 2 and the stopper ring 14. A second annular seal member 16 formed of elastic material such as rubber or the like is disposed on the outerside surface of the stopper ring 14 at the inner peripheral portion thereof. Preferably, the seal member 16 is adhered to the stopper ring 14 by such as bonding, baking or the like. The inner peripheral portion of the seal member 16 engages air-tightly with the outer circumference of the push rod 12 in the non-actuated condition of the master cylinder. Thus, the cylinder portion 2 of the master cylinder 1 is sealed air-tightly from the outside by the seal members 15 and 16 in the non-actuated condition.

A reduced diameter portion 12a is formed in the push rod 12 which extends from a position adjacent to (spaced axially by a distance "s") the second seal member 16 in the direction of the axis of the master cylinder by a distance corresponding to the length of the stroke of the piston.

The master cylinder according to the present invention has a construction described as above, thus, when high vacuum is applied to the pressure chamber 7 and the supply chamber 8 during an oil filling process, the seal members 15 and 16 can effectively seal the cylinder portion 2 from the outside to prevent any air being sucked into the cylinder portion 2, whereby oil can be filled into the cylinder portion 2 effectively and quickly. It will be noted that the piston 3 is urged to the most retracted position by the spring 4 when vacuum pressure is applied in the cylinder portion 2.

In the normal operating condition, when the push rod 12 is moved leftward to actuate the master cylinder, the reduced diameter portion 12a will align with the second seal member 16 to act as a relief and to communicate a space 20 defined inside of the second seal member 16 with atmosphere. The reduced diameter portion 12a may be replaced by a relief including an axial and radial passage 12c which is shown in broken lines in FIG. 1 and which is permanently conntected to the atmosphere at the rightside end (not shown) of the push rod 12.

Figure 2:
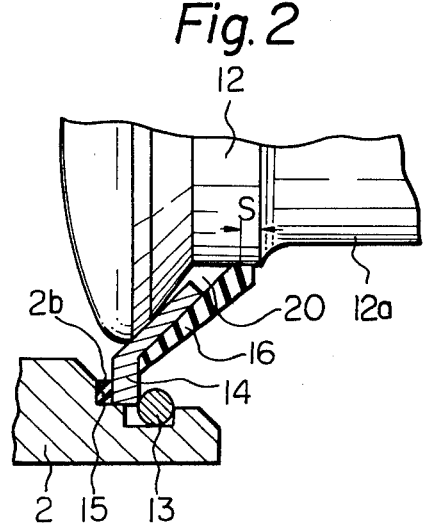
FIG. 2 is an enlarged partial view of the portion A in FIG. 1.
Figure 3:
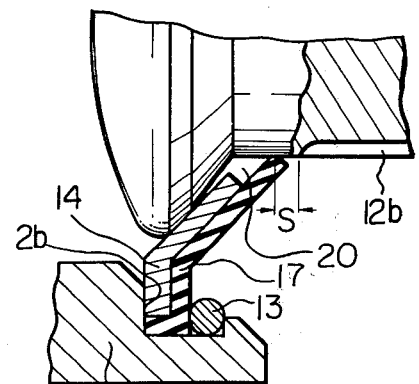
FIG. 3 is a view similar to FIG. 2 but showing a modified form.

In a modified form shown in FIG. 3, the seal members 15 and 16 in FIGS. 1 and 2 are modified to form a single seal member 17, and a portion of the seal member 17 is disposed between the outer circumference of the stopper ring 14 and the inner circumference of a groove formed in the cylinder portion 2. Further, the reduced diameter portion 12a in the embodiment of FIGS. 1 and 2 is replaced by one or more axially extending grooves 12b formed in the outer periphery of the push rod 12, to thereby form a relief.

Figure 4:
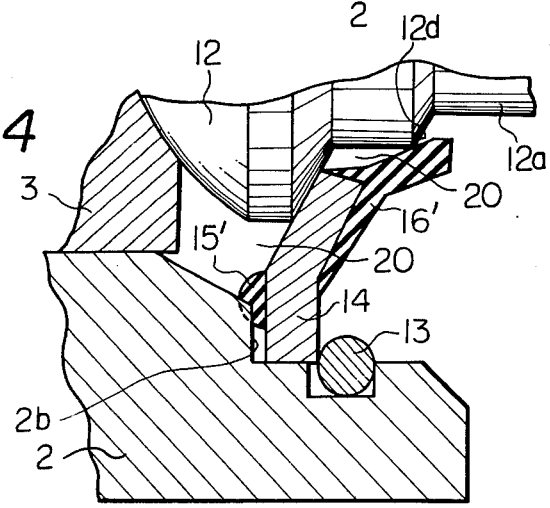
FIG. 4 is a view similar to FIGS. 2 and 3 but showing another embodiment of the present invention.

A further modified form of the present invention is shown in FIG. 4, in which, an annular first seal member 15' having a generally semi-circular cross-section is secured to the innerside surface of stopper ring 14 to abut with shoulder 2b of the cylinder portion 2. An annular second seal member 16' engages with a shoulder 12d defined by a reduced diameter portion 12a of the push rod 12. The embodiment of FIG. 4 is advantageous in preventing or minimizing a pressure rise in the space 20 when the master cylinder is actuated from the non-actuated condition. In the embodiments shown in FIGS. 2 and 3 the volume of space 20 formed in the cylinder 2 and sealed by the seal members 15, 16, 17 and the cup seal 6 will decrease in accordance with the retracting movement of the push rod 12 in the rightward direction after the space 20 is sealed from the atmosphere. The distance "S" shown in the drawings denotes the retracting movement. The pressure in the space 20 will thereby rise and air confined in the space 20 will tend to leak into the supply chamber 8. While in the embodiment of FIG. 4, the seal member 16' may be arranged to contact lightly with the shoulder 12d in the non-actuated condition of the master cylinder, otherwise, a small clearance may be left therebetween. In either case, when high vacuum is applied in the master cylinder a differential pressure is generated across the seal member 16' to urge the seal member 16' tightly against the shoulder 12d.

Although the embodiments shown in the drawings relate to so-called single type master cylinder, the present invention may be applied to master cylinders of any other type, such as a tandem type master cylinder wherein two pistons are arranged in tandem in a cylinder of a uniform diameter, or a dual type master cylinder wherein two pistons with different diameters are working in respective cylinders of different diameters.

In the embodiment of FIG. 2, the second seal member 16 is secured to the stopper ring 14, but the seal member 16 may be carried on the push rod 12 and sealingly contact with the stopper ring 14. In such case, the reduced diameter portion 12a or the passage 12c may be omitted.

As heretofore described, the master cylinder according to the present invention comprises a seal member are tightly sealing the inner periphery of the cylinder portion, the stopper ring, and the push rod when the master cylinder is in the non-actuated condition to isolate the inside of the cylinder portion from the atmosphere. Thus it is possible to apply high vacuum in the cylinder portion without causing intrusion of atmospheric air, and thus, oil can be filled into the master cylinder completely and quickly. Further, the seal member is effective in preventing ingress of water, dust or the like during storage or transportation of the master cylinder.

What is claimed is:

1. A master cylinder comprising:
   a housing defining therein a cylinder having an open end;
   a piston slidably fitting within said cylinder;
   a push rod having a head portion and a stem portion extending axially from said head portion through said open end of said cylinder, said push rod being movable from a non-actuated position to an actuated position whereat said head portion moves said piston within said cylinder to compress hydraulic fluid within said cylinder;
   spring means for urging said piston toward said open end of said cylinder and for thereby urging said push rod to said non-actuated position;
   stop ring means retained in said housing adjacent said open end of said cylinder for abutting against said head portion when said push rod is urged to said non-actuated position and for thereby defining said non-actuated position;
   first annular seal means, disposed between a radial shoulder formed in said housing and a radially outer portion of the axially inner surface of said stop ring means, for defining a first seal;
   second annular seal means, secured to the axially outer surface of said stop ring means, for sealingly engaging an outer surface of said stem portion at least when said push rod is in said non-actuated position, and for thereby forming a second seal sealing the interior of said cylinder from the exterior atmosphere when said push rod is in said non-actuated position; and
   relief means for releasing said second seal and thereby connecting a portion of said interior of said cylinder with the exterior atmosphere when said push rod moves from said non-actuated position toward said actuated position.

2. A master cylinder as claimed in claim 1, wherein said relief means comprises an axial passage extending axially through said stem portion, and a radial passage connected to said axial passage and opening on the outer surface of said stem portion at a position axially outside of said second seal means when said push rod is in said non-actuated position and axially inside of said second seal means when said push rod is in said actuated position.

3. A master cylinder as claimed in claim 1, wherein said relief means comprises an axially extending groove formed in the outer surface of said stem portion.

4. A master cylinder as claimed in claim 1, wherein said stem portion includes a larger diameter portion adjacent said head portion and a small diameter portion, said second seal means sealing against said large diameter portion when said push rod is in said non-actuated position, and said second seal means being spaced from said small diameter portion when said push rod is in said actuated position.

5. A master cylinder as claimed in claim 1, wherein said stem portion includes a large diameter portion adjacent said head portion and a small diameter portion, said large and small diameter portions defining therebetween a shoulder, said second seal means sealing against said shoulder when said push rod is in said non-actuated position, and said second seal means being spaced from said small diameter portion when said push rod is in said actuated position.

* * * * *